(12) United States Patent
Merz

(10) Patent No.: US 6,797,099 B2
(45) Date of Patent: Sep. 28, 2004

(54) METHOD FOR STRUCTURAL BONDING ON PAINTED SURFACES

(75) Inventor: Peter W. Merz, Wollerau (CH)

(73) Assignee: Sika Schweiz AG, Zurich (CH)

(*) Notice: Subject to any disclaimer, the term of this patent is extended or adjusted under 35 U.S.C. 154(b) by 308 days.

(21) Appl. No.: 10/053,696

(22) Filed: Jan. 24, 2002

(65) Prior Publication Data

US 2002/0121332 A1 Sep. 5, 2002

(30) Foreign Application Priority Data

Mar. 5, 2001 (EP) .............................. 01104544

(51) Int. Cl.⁷ .............................. B32B 31/00
(52) U.S. Cl. ...................... 156/153; 156/154
(58) Field of Search ................. 156/153, 154

(56) References Cited

U.S. PATENT DOCUMENTS

| | | | | |
|---|---|---|---|---|
| 3,622,371 A | * | 11/1971 | Sparks ................... | 156/94 |
| 4,707,391 A | * | 11/1987 | Hoffmann, Sr. ......... | 156/94 |
| 4,732,633 A | * | 3/1988 | Pokorny ................ | 156/154 |
| 4,803,105 A | * | 2/1989 | Kretow et al. ......... | 428/41.1 |

FOREIGN PATENT DOCUMENTS

WO    WO 94/04470    3/1994

OTHER PUBLICATIONS

Shields, J, "Adhesives Handbook", CRC Press, 1970, pp. 256, 257.*

Landrock, Arthur H., "Process Handbook on Surface Preparations for Adhesive Bonding", Technical Repo 4883, Picatinny Arsenal, Dover, New Jersey, Dec. 1975, pp. 3–22.*

* cited by examiner

Primary Examiner—Jeff H. Aftergut
(74) Attorney, Agent, or Firm—Burns, Doane, Swecker & Mathis, L.L.P.

(57) ABSTRACT

A new method for the bonding of painted construction parts, in particular for the structural bonding of painted metals surfaces is described. In a first step of the inventive method, a carcase work adhesive is applied onto all parts of the oiled steel sheet on which later on, during assembly, bonding shall be performed. For the bonding, the lacquer layers on the carcase work adhesive are removed prior to the application of an assembly adhesive. Said method is simple and rugged. In comparison with the state of the art it is more economic, enables a highly structural and high strength joining with high torsional strength and a high ageing resistant compound quality.

17 Claims, No Drawings

METHOD FOR STRUCTURAL BONDING ON PAINTED SURFACES

CROSS REFERENCE TO RELATED APPLICATIONS

This application claims the priority of the European patent application No. 01104544.0, filed Mar. 5, 2001 the disclosure of which is incorporated herein by reference in its entirety.

BACKGROUND OF THE INVENTION

The invention relates to a method for the structural or high grade, respectively, bonding of painted bodies such as car bodies or modules, in particular painted metal modules or plastic modules.

In vehicle construction the tendency goes towards light weight construction, the production of larger modules as well as the enhancement of the tortional stiffness of the car body or thereto mounted parts such as e.g. doors, front flaps and rear flaps etc. An essential requirement therefor is the application of adhesives instead of welding points and sealants. In future, welding points will almost only be needed for the positioning of the parts (dimensional accuracy) during production. The growing desire aims at adhesives that structurally or frictionally, respectively, join the modules with high strength transfer, and at bonded structures that behave like unitary parts.

The structural bonding in car body construction where high grade adhesives (so called carcase work adhesives) are applied to oiled metallic substrates, has already achieved a high level of quality. Today already so called crash resistant carcase work adhesives are known that upon a crash do not lead to a rupture within the adhesive, but that are able to force the composite to fold.

Contrary thereto the structural bonding during assembly, where varnished metal surfaces are at issue, is not yet solved to satisfaction, since the build up of the lacquer itself can not take over the structural forces. The build up of the lacquer usually consists in the following layers: after degreasing, the metal surfaces are phosphated, coated by means of cathodic dipping finishing (CDF) and annealed in an oven at high temperatures around 180° C. during about 30 minutes. Said CDF layer is responsible for the protection against corrosion. In the following finishing process, a "filler" and a basic varnish, and optionally furthermore a coating lacquer, are applied that are dried in a re-circulated air oven at temperatures around 130° C. during about 20 minutes. Practice has now shown, that the adhesion of the CDF to the phosphate layer or also of the "filler" to the coating lacquer can fail due to high stress and therewith are the strength limiting factors. Furthermore, in the lacquer layer a predetermined braking point is provided to insure that in case of e.g. falling stones, the damage is only within the cover lacquer itself (now visual colour changes) and not between "filler" layer and basic varnish. Said predetermined braking point only admits a bonding with a modulus of shear of about 5 MPa.

According to the state of the art the following method is applied e.g. for the bonding of panes. Either the bonding is performed directly on the cover lacquer, or the CDF coated flange of the car body is masked with an adhesive tape or with an organic composition such as e.g. PVC plastisol. The plastisol is e.g. gelled by means of an IR-radiator and thereby achieves solid consistency. At the end of the finishing process and prior to the pane assembly the flange masque usually is manually removed and the direct glazing performed on the CDF. The method as described above does not allow a reliable bonding with high structural forces, since at shear forces >8–10 MPa the adhesion of the CDF layer fails.

The present invention therefore aims at an improved method that surpasses the limitations of the state of the art and enables structural bonding of >8 MPa in final assembly.

BRIEF SUMMARY OF THE INVENTION

Hence, it is a general object of the invention to provide a method for the bonding, in particular the structural bonding, on surfaces after the application of a lacquer, wherein the surface is coated with at least one structural polymer at least in the region of bonding, and wherein said surface is provided with at least one lacquer layer, and wherein said at least one lacquer layer is removed from the at least one structural polymer prior to the application of an assembly adhesive.

The surface to be bonded usually is a metal surface or a plastic surface,

DETAILED DESCRIPTION OF THE INVENTION

The inventive method consists in the following steps. In car body construction a structural polymer, in particular a carcase work adhesive, is applied to at least those parts of the metal surface or the plastic surface to be bonded, in particular the usually oiled sheet metal, on which later on, during assembly, bonding is intended.

Optionally, prior to the application of the structural polymer, the surfaces can be treated with a method improving the adhesion and/or ageing resistance, and/or subjected to a treatment or a coating, respectively, improving the adhesion and/or ageing resistance, such as e.g. chromating, flame treating, anodising, primer coating, treatment with non-layer-forming adhesion improving agents, etc. Further methods, treatments or coatings are known to the stilled person.

In the inventive method, upon the bonding of metal surfaces the structural polymer acts as corrosion protection instead of the CDF coating. Independent of the kind of surface, the adhesive should be applied in such a thickness that after application all unevenness and edges are coated. Usually a flat worm of 0.5 to 3 mm is sufficient. A thicker layer of course is possible, however for economic and ecologic reasons not of interest. After the varnishing process the painted adhesive is prepared for the bonding, e.g. for pane bonding. Thereby the paint and a thin layer of usually about 0.2 mm of the structural polymer, in particular of the carcase work adhesive, have to be removed either thermically, such as e.g. by means of a laser, or mechanically by e.g. milling, grinding, planing, shaping, brushing etc. Such removal (thermically and/or mechanically) can easily be performed e.g. automatically by means of a robot. Such removal is simple, since no danger for damaging the surface of the basic material, e.g. the zinc coating of a steel sheet, exists. Furthermore, a correct removal of the painting always leaves a qualitatively uniform substrate for the assembly adhesive applied thereon after said removal, such that a high procedural security and rugged compound quality is ensured. The removal of the painting can be performed separate from the application of the assembly adhesive or simultaneously directly prior or during the application of the assembly adhesive. Simultaneously means that the paint layer on the carcase work adhesive is milled of and the assembly adhesive is applied to or pressed to the respectively freed surface in the same step of the procedure. The assembly adhesive can e.g. be applied as such or placed on a construction part or module.

In a further embodiment, a covering tape or an organic composition—analogous to usual methods, such as e.g. methods using PVC plastisols (as described above)—can be applied to the freshly applied, partially cross-linked or entirely cured structural polymer (carcase work adhesive) that are then removed prior to assembly.

The inventive method is applicable for bonding modules, in particular in car body construction, including pane bonding. Such bondings are also within the scope of the present invention. In the scope of the present invention, structural polymers, in particular carcase work adhesives, are considered to be adhesives with a modulus of shear >5 MPa, in particular >8 MPa.

Preferred adhesives are e.g. epoxid adhesives, caoutchouc adhesives, polyurethane adhesives and acrylate adhesives.

The assembly adhesive preferably is a reactive material that cures at ambient temperature, that can be present as one component or two component composition, and that after curing provides high bending strength and torsional strength as well as a modulus of shear of >5 MPa, in particular >8 MPa. Suitable assembly adhesives are e.g. polyurethane adhesives, acrylate adhesives, melting adhesives and silane cross-linking adhesives.

The inventive method is simple and rugged. In comparison with the state of the art it is more economic, enables a highly structural bonding with high torsional strength and a high ageing resistant compound quality.

The following example shall further illustrate the invention without limiting the extent of the invention in any way.

EXAMPLE

A steel sheet with an oil level of 2 to 3 g/m$^2$ is coated with a highly structural carcase work adhesive, e.g. SikaPower™-490-5, in a thickness of about 1 mm. Said coated steel sheet then is treated in pre-treatment bathes, annealed in the CDF-oven at a temperature around 180° C. during 30 minutes and in the thereon following varnishing process coated with filler, basic varnish and coating lacquer. After the finishing (about 0.2 mm thickness) on the carcase work adhesive has been removed with a milling machine, structural adhesives with high modulus of shear of >5 MPa are applied to this freshly prepared underground in the form of a worm with triangular cross-section. After a curing time of seven days at ambient humidity, as well as after further seven days storage in water at room temperature, and after a further seven days storage in cataplasm (70° C. and 100% relative humidity) excellent adhesion qualities were observed.

While there are shown and described presently preferred embodiments of the invention, it is to be distinctly understood that the invention is not limited thereto but may be otherwise variously embodied and practised within the scope of the following claims.

What is claimed is:

1. A bonding method comprising the following steps:
   (a) applying a layer of a carcase work adhesive to a surface at least in a region where the surface is to be bonded;
   (b) applying at least one lacquer layer on the carcase work adhesive;
   (c) drying the at least one lacquer layer;
   (d) removing the at least one lacquer layer as well as a portion of the carcase work adhesive layer; and
   (e) applying an assembly adhesive to the portion of the carcase work adhesive layer not removed in step (d).

2. The method of claim 1, wherein the removal of the lacquer layers is performed mechanically.

3. The method of claim 2, wherein the mechanically performed removal is made by grinding, planning, shaping, brushing or milling.

4. The method of claim 3, wherein the mechanically performed removal is made by milling.

5. The method of claim 1, wherein the carcase work adhesive is applied directly onto the surface.

6. The method of claim 5, wherein the surface is a metal surface that has not been treated by CDF-coating.

7. The method of claim 1, wherein the carcase work adhesive can absorb high strengths and has a modulus of shear of >5 MPa.

8. The method of claim 7, wherein the carcase work adhesive has a modulus of shear of >8 MPa.

9. The method of claim 1, wherein the assembly adhesive can absorb high strengths and has a modulus of shear of >5 MPa.

10. The method of claim 9, wherein the assembly adhesive has a modulus of shear >8 MPa.

11. The method of claim 1, wherein the bonded surface is a combination of construction elements and/or modules.

12. The method of claim 11, wherein said bonded surface is a part of a vehicle.

13. The method of claim 1, wherein the surface is a metal surface.

14. The method of claim 1, wherein after the application of the carcase work adhesive a cover tape is applied that is removed prior to the finishing.

15. The method of claim 1, wherein the assembly adhesive is previously applied onto a construction part or module.

16. The method of claim 1, wherein the carcase work adhesive is an epoxide, a caoutchouc, a polyurethane or an acrylate.

17. The method of claim 1, wherein the assembly adhesive is a one component or two component adhesive selected from polyurethane adhesives, acrylate adhesives, melting adhesives or silane cross-linking adhesives.

* * * * *